United States Patent [19]
Shimabukuro

[11] Patent Number: 5,595,779
[45] Date of Patent: Jan. 21, 1997

[54] EUCALYPTUS TEA

[75] Inventor: Kenji Shimabukuro, Nago, Japan

[73] Assignee: Yugen Kaisha Okinawa Yukali Farm, Okinawa, Japan

[21] Appl. No.: 396,690

[22] Filed: Mar. 1, 1995

Related U.S. Application Data

[63] Continuation of Ser. No. 104,826, Aug. 10, 1993, abandoned.

[51] Int. Cl.$^6$ .................................................. A23F 3/00
[52] U.S. Cl. ............................................................ 426/597
[58] Field of Search .............................................. 426/597

[56] References Cited

PUBLICATIONS

STN Data Base, File Caba. STN Acc. No. 78:70749. Abstracting Japanese Poultry Science. 1977. vol. 14, No. 3, pp. 102–108.

Dialog Data Base, File S1(FSTA), Dialog Acc. No. 00329576 Abstracting USSR Patent 1,202,540A, 1986.

Dialog Data Base, File 351(WPI), Dialog Acc. No. 009472497. Abstracting SU 1738212, Jun. 7, 1992.

Dialog Data Base, file 351(WPI) Dialog Acc. No. 004700443 Abstracting SU 1,202,540, Jan. 7, 1986.

STN Data Base, File Caplus. STN Acc. No. 1990:4578–4586 Abstracting Linchen Huaxue Yu Gongye. 1989. 9(4), pp. 49–54.

*Primary Examiner*—Anthony J. Weier
*Attorney, Agent, or Firm*—McGlew and Tuttle

[57] ABSTRACT

This invention relates to a Eucalyptus tea prepared by steaming, rumple-twisting and drying Eucalyptus leaves, which contains a large amount of soluble polysaccharides and tannins, and further richly contains inorganic components such as potassium, sodium and calcium.

2 Claims, No Drawings

EUCALYPTUS TEA

This is a continuation of application Ser. No. 08/104826 filed Aug. 10, 1993, now abandoned.

BACKGROUND OF INVENTION

1. Field of the Invention

The present invention relates to tea made from Eucalyptus leaves, which richly contains aroma and nutrients.

2. Description of the Prior Art

As tea made from leaves other than green tea leaves, there have been well known, for example, wulung tea, Gymnema tea, Silvervine tea, Ashitaba tea, Olive tea, and Saururaceous tea.

Although such teas contain plenty of vitamins, they contain less tannic components known as the mixtures of catechins, which have been reported to have various effects such as an effect on intestinal orders, a controlling effect on absorption of glucides from the intestine, a controlling effect in the production of glucides having an excretion accelerative action on cholesterol and lipids giving lesions to living tissues and organs (i.e., antioxidizing action), an anticancer action, an anticancerity, a controlling action of hypercholesterol, an antihypertensive action and antibacterial action.

SUMMARY OF THE INVENTION

The object of the present invention is to provide a tea which contains plenty of fats, soluble polysaccharides and tannins, which, furthermore, richly contains inorganic components such as potassium, sodium and calcium, and which can prepared by steaming, rumple-twisting and heat-drying Eucalyptus leaves.

DETAILED DESCRIPTION OF THE INVENTION

The tea according to the present invention is made from leaves of Robsta Eucalyptus (Eucalyptus Robsta Smith) or Lemon Eucalyptus (Eucalyptus Citriodora Hook) which has been known as a feed for koalas and cultured in Okinawa Islands, Japan.

The tea leaf portion of such Eucalyptus contains plenty of tannic components known as the mixtures of lipids, glucides and catechines. Therefore, it can be expected that the essential oil components of Eucalyptus oil extracted from said lipids may exhibit pharmaceutical effects on cold syndromes, diarrhea, enteritis, asthma, rhinitis, and the like. Such effects are also expected to be given by said glucides and tannic components.

In addition, such leaves contain plenty of potassium, calcium and phosphorus. Especially in regard to calcium, the effect of the shortage of intake of calcium has been pointed out recently. Therefore, it is also expected that such tea leaves have a high contribution in regard to the formation of good bone.

EXAMPLES

The production of the Eucalyptus tea of the present invention can be preferably carried out in the same manner as the production process for green tea.

That is, at first, the raw leaves of Robsta Eucalyptus (ohba Yukari as Japanese name; Eucalyptus Robsta Smith as a botanical name) or Lemon Eucalyptus (Lemom Yukarinoki as Japanese name; Eucalyptus Citriodora Hook as a botanical name) were steamed by using about 100° C. of water vapor for about 30 sec., followed by cooling rapidly. In this procedure, the steaming step not only causes loss of activity of the oxidizing enzyme in the raw tea leaves, but also causes an increase in the softness of the tea leaves to bring out the aromatic components of Eucalyptus tea and to make it easy to rumple-twist and dry the leaves. On the other hand, the cooling step prevents the tea leaves from undergoing colour and gloss degradation.

Next, the resulting tea leaves were dried as a pre-treatment first step for a more precise rumple-twisting, and then rumple-twisted. The resultant tea leaves were further dried to a moisture content of 5% or less, in order to give the tea leaves storage stability for a long time, followed by finely grinding the tea leaves to a finely ground tea in dried form to enhance the elution of the components therein and to give out an aroma from the leaves.

The Eucalyptus tea thus obtained was compared with commercially available Gymnema tea and Wulung tea in their contents of general chemical components and inorganic components in dried form. The results are shown in Table 1 below.

TABLE 1

The contents of general chemical components and inorganic components in Eucalyptus tea, Gymnema tea and Wulung tea (in dried form)

|  | Eucalytus tea | Gymnema tea | Wulung tea |
| --- | --- | --- | --- |
| crude proteins | 7.6% | 10.2% | 21.1% |
| crude fats | 7.4 | 1.6 | 1.8 |
| ash content | 5.0 | 8.7 | 5.7 |
| crude fibers | 16.8 | 36.7 | 16.5 |
| glucides | 49.8 | 44.1 | 43.5 |
| caffeine | ND | 1.2 | 2.0 |
| tannins | 13.6 | 0.5 | 10.4 |
| potassium | 1731.3 mg % | 1327.0 mg % | 1366.0 mg % |
| sodium | 837.4 | 86.2 | 7.4 |
| calcium | 592.5 | 868.8 | 188.0 |
| magnesium | 59.0 | 342.0 | 205.0 |
| phosphorus | 186.7 | 384.8 | 245.0 |
| iron | 9.5 | 88.4 | 81.0 |
| copper | 0.5 | 1.4 | 21.0 |
| zinc | 2.7 | 2.2 | 2.3 |
| lead | ND | ND | ND |
| selenium | 0.9 | 1.0 | 7.2 |

ND: no detection

As shown in Table 1, the crude proteins, ash and crude fibers contents of the Eucalyptus tea of the present invention are lower than those of the comparative teas, whereas the crude fats, glucides and tannins contents are higher than those of the comparative teas.

In the inorganic components contents, although Gymnema tea shows the highest values in the calcium and iron contents among the tested teas, the Eucalyptus tea of the present invention shows the highest values in the potassium, sodium and zinc contents compared to Gymnema tea and Wulung tea.

Accordingly, the Eucalyptus tea of the present invention can be expected to exhibit pharmaceutical effects, for example, on cold syndrome, diarrhea and enteritis, since it has extremely high contents of fats, glucides and tannins as general chemical components.

In addition, since as much as about 50% of the glucides content except for crude fibers leads to the assumption of the existence of a large amount of soluble polysaccharides in the Eucalyptus tea of the present invention, it is considered that the tea has an effect on intestinal order, a controlling effect on absorption of glucides from the intestine and an accelerative action on excretion of cholestrol, as the biological regulative functions of such polysaccharides.

The Eucalyptus tea of the present invention contains a large amount of tannic components which are the main components of bitter astringent taste known as the mixtures of catechins. Therefore, it can be expected that the Eucalyptus tea exhibits various effects such as an effect on intestinal orders, a controlling effect on the absorption of glucides from the intestine, a controlling effect on the production of lipids giving lesions to living tissues and organs (i.e. antioxidizing action), an antimutagenicity, anticancer action, a controlling action on hypercholesterol, an antihypertensive action and antibacterial action, which have been particularly noted recently.

As mentioned above, the Eucalyptus tea of the present invention has a specific flavor derived from the essential oil components, contains a large amount of soluble polysaccharides and tannins, and further richly contains inorganic components such as potassium, sodium, calcium and magnesium. Therefore, the Eucalyptus tea of the present invention is very useful for the preservation and improvement of one's health.

What is claimed is:

1. Finely ground Eucalyptus tea in dried form, constituting a tea product made solely of Eucalyptus leaves and produced by a process which comprises the sequential steps of:

(1) steaming raw Eucalyptus tea leaves alone by contact thereof with water vapor sufficiently to cause loss of activity of attendant oxidizing enzymes in the raw tea leaves and also cause an increase in the attendant softness of the tea leaves, whereby to bring out the aromatic components of the Eucalyptus tea leaves and make it easy to rumple-twist and dry the tea leaves, the steaming being effected at about 100° C. for about 30 seconds, (2) cooling the steamed tea leaves sufficiently rapidly to prevent color and gloss degradation of the tea leaves, (3) drying the cooled tea leaves sufficiently for effecting more precise rumple-twisting, (4) rumple-twisting the dried tea leaves, (5) further drying the rumple-twisted tea leaves to a moisture content of at most about 5% for increasing long term storage stability, and (6) finely grinding the further dried tea leaves sufficiently to provide a finely ground tea in dried form for enhancing elution of the attendant components therein and for giving out an aroma therefrom, said finely ground tea in dried form having a specific flavor derived from the attendant essential oil components therein and being rich in fats, soluble polysaccharides and tannins, and in potassium, sodium and calcium, and comprising about the following detected component content:

|   | |   |
|---|---|---|
| 1. | crude proteins | 7.6% |
| 2. | crude fats | 7.4% |
| 3. | ash content | 5.0% |
| 4. | crude fibers | 16.8% |
| 5. | glucides | 49.8% |
| 6. | tannins | 13.6% |
| 7. | potassium | 1731.3 mg % |
| 8. | sodium | 837.4 mg % |
| 9. | calcium | 592.5 mg % |
| 10. | magnesium | 59.0 mg % |
| 11. | phosphorus | 186.7 mg % |
| 12. | iron | 9.5 mg % |
| 13. | copper | 0.5 mg % |
| 14. | zinc | 2.7 mg % |
| 15. | selenium | 0.9 mg %. |

2. Finely ground Eucalyptus tea in dried form, constituting a tea product made solely of Eucalyptus leaves selected from the group consisting of Robsta Eucalyptus (Eucalyptus Robsta Smith) and Lemon Eucalyptus (Eucalyptus Citriodora Hook) and produced by a process which comprises the sequential steps of:

(1) steaming raw Eucalyptus tea leaves, selected from said Robsta Eucalyptus and said Lemon Eucalyptus tea leaves, alone by contact thereof with water vapor sufficiently to cause loss of activity of attendant oxidizing enzymes in the raw tea leaves and also cause an increase in the attendant softness of the tea leaves, whereby to bring out the aromatic components of the Eucalyptus tea leaves and make it easy to rumple-twist and dry the tea leaves, the steaming being effected at about 100° C. for about 30 seconds, (2) cooling the steamed tea leaves sufficiently rapidly to prevent color and gloss degradation of the tea leaves, (3) drying the cooled tea leaves sufficiently for effecting more precise rumple-twisting, (4) rumple-twisting the dried tea leaves, (5) further drying the rumple-twisted tea leaves to a moisture content of at most about 5% for increasing long term storage stability, and (6) finely grinding the further dried tea leaves sufficiently to provide a finely ground tea in dried form for enhancing elution of the attendant components therein and for giving out an aroma therefrom, said finely ground tea in dried form having a specific flavor derived from the attendant essential oil components therein and being rich in fats, soluble polysaccharides and tannins, and in potassium, sodium and calcium, and comprising about the following detected component content:

|   | |   |
|---|---|---|
| 1. | crude proteins | 7.6% |
| 2. | crude fats | 7.4% |
| 3. | ash content | 5.0% |
| 4. | crude fibers | 16.8% |
| 5. | glucides | 49.8% |
| 6. | tannins | 13.6% |
| 7. | potassium | 1731.3 mg % |
| 8. | sodium | 837.4 mg % |
| 9. | calcium | 592.5 mg % |
| 10. | magnesium | 59.0 mg % |
| 11. | phosphorus | 186.7 mg % |
| 12. | iron | 9.5 mg % |
| 13. | copper | 0.5 mg % |
| 14. | zinc | 2.7 mg % |
| 15. | selenium | 0.9 mg %. |

\* \* \* \* \*